US011582318B2

(12) United States Patent
Van Rotterdam (10) Patent No.: US 11,582,318 B2
(45) Date of Patent: *Feb. 14, 2023

(54) ACTIVITY DETECTION IN WEB APPLICATIONS

(71) Applicant: CITRIX SYSTEMS, INC., Fort Lauderdale, FL (US)

(72) Inventor: Jeroen Mattijs Van Rotterdam, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 104 days.

This patent is subject to a terminal disclaimer.

(21) Appl. No.: 16/999,349

(22) Filed: Aug. 21, 2020

(65) Prior Publication Data

US 2020/0382614 A1 Dec. 3, 2020

Related U.S. Application Data

(63) Continuation of application No. 16/276,924, filed on Feb. 15, 2019, now Pat. No. 10,764,386.

(51) Int. Cl.
*H04L 67/50* (2022.01)
*H04L 67/025* (2022.01)

(52) U.S. Cl.
CPC .......... *H04L 67/535* (2022.05); *H04L 67/025* (2013.01)

(58) Field of Classification Search
CPC .............................. H04L 67/22; H04L 67/025
USPC ........................................................ 709/224
See application file for complete search history.

(56) References Cited

U.S. PATENT DOCUMENTS

| 7,673,340 | B1 | 3/2010 | Cohen et al. |
| 8,554,699 | B2 | 10/2013 | Ruhl et al. |
| 8,583,584 | B2 | 11/2013 | Ruhl et al. |
| 8,972,332 | B2 | 3/2015 | Ruhl et al. |
| 9,176,744 | B2 | 11/2015 | Lee |
| 9,538,345 | B2 | 1/2017 | Sah et al. |
| 2007/0150464 | A1 | 6/2007 | Brave et al. |
| 2010/0235909 | A1* | 9/2010 | Eynon .................. H04L 63/168 726/22 |
| 2012/0311139 | A1 | 12/2012 | Brave et al. |
| 2013/0125143 | A1 | 5/2013 | Kikuchi et al. |
| 2014/0283067 | A1* | 9/2014 | Call .................... H04L 63/1416 726/23 |
| 2018/0020024 | A1* | 1/2018 | Chao .................. H04L 63/1425 |
| 2018/0167402 | A1 | 6/2018 | Scheidler et al. |

(Continued)

*Primary Examiner* — James E Springer (57) ABSTRACT

An analytics server receives from client computing devices end-user events. Each client computing device is operated by an end-user to access an application at a web server based on the end-user events resulting in calls being passed through a proxy to the web server. The analytics server receives from the proxy the calls being made to the web server, and receives return responses from the web server being passed through the proxy. The return responses correspond to activities being performed within the application. The end-user events are correlated with the corresponding calls and return responses from the proxy. Respective correlated end-user events, calls and return responses are translated into respective event vectors. The respective event vectors are processed to determine similarities among the client computing devices. The similar activities are associated with a quality indicator to identify anomalies within the application for corrective action to be taken.

20 Claims, 6 Drawing Sheets

(56) References Cited

U.S. PATENT DOCUMENTS

| | | | |
|---|---|---|---|
| 2018/0241587 A1* | 8/2018 | Bull | H04L 12/66 |
| 2019/0020680 A1* | 1/2019 | Khalimonenko | H04L 67/025 |
| 2019/0034937 A1* | 1/2019 | Zhang | G06N 5/022 |
| 2019/0260794 A1 | 8/2019 | Woodford et al. | |
| 2020/0099753 A1 | 3/2020 | Fleck et al. | |

* cited by examiner

ACTIVITY DETECTION IN WEB APPLICATIONS

RELATED APPLICATIONS

This application is a continuation of U.S. application Ser. No. 16/276,924 filed Feb. 15, 2019, which is hereby incorporated herein in its entirety by reference.

TECHNICAL FIELD

The present disclosure relates to web applications, and more particularly, to analyzing activities performed within an application across a large set of end-users.

BACKGROUND

Software as a Service (SaaS) is a computing approach to software delivery by which applications are centrally hosted on one or more third-party servers (e.g., in the cloud) and are typically provided on a subscription basis to users. SaaS applications are offered for numerous areas, including business, accounting, and even gaming applications.

SaaS applications are typically accessed on client computing devices via an internet browser. A large set of end-users within an enterprise may access the same SaaS application, where each end-user causes the SaaS application to perform various activities.

Many of the activities performed within the application are similar across the large set of end-users. Since SaaS applications are on third-party servers, it is difficult for an enterprise to monitor activities of their end-users within a SaaS application since the enterprise does not own the server providing the SaaS application.

SUMMARY

An analytics server includes a memory and a processor coupled to the memory. The processor is configured to receive from client computing devices end-user events. Each client computing device is operated by an end-user to access an application at a web server based on the end-user events resulting in calls being passed through a proxy to the web server. The processor receives from the proxy the calls being made to the web server, and receives return responses from the web server being passed through the proxy. The return responses correspond to activities being performed within the application. The end-user events are correlated with the corresponding calls and return responses from the proxy for each client computing device. Respective correlated end-user events, calls and return responses are translated into respective event vectors. The respective event vectors are processed to determine similarities among the client computing devices, with the similarities corresponding to similar activities. The similar activities are associated with a quality indicator to identify anomalies within the application for corrective action to be taken.

The calls being passed through the proxy to the web server may comprise representational state transfer (REST) calls.

The processor may be further configured to process the respective event vectors by placing the respective event vectors in sequence for each client computing device. An n-set of event vectors are selected in sequence from the sequence of event vectors for each client computing device, where n>1, and with an activity within the application corresponding to the selected n-set of event vectors in sequence. A composite activity vector is generated by adding together the event vectors in the n-set of event vectors in sequence for each client computing device. The composite activity vectors for each client computing device are placed in vector space. The similarities among the client computing devices are determined based on similarities between the composite activity vectors among the client computing devices.

The processor may be further configured to receive contextual information associated with the end-user events, and include the contextual information in the respective event vectors. The contextual information may be provided based on each client computing device monitoring the end-user events by capturing events at the document object model (DOM) level within a web page, and extracting end-user event attributes from the DOM. The end-user event attributes provide the contextual information on the corresponding end-user event.

The corresponding calls and return responses from the proxy include parameter information noise, and wherein the processor may be further configured to remove the parameter information noise by applying one or more reducer functions.

The one or more reducer functions may comprise translating each event vector into one or more reduced event vectors, with the resulting reduced event vectors being used as the event vectors by the processor.

The n-set of event vectors in sequence may correspond to a pattern that includes a beginning and an end of the corresponding activity.

The processor may be further configured to incrementally vary n for the n-set of event vectors, generate an activity vector for each value of n, examine each activity vector for a pattern, and select the n corresponding to the activity vector having a pattern.

The quality indicator imay be based on one or more statistics associated with the end-users accessing the application.

The corrective action may comprise recommending to one or more end-users which end-users events to use for performing a particular activity within the application.

Another aspect is directed to a method for operating the analytics server as described above.

Yet another aspect is directed to a computing system comprising a proxy and an analytics server. The proxy may be between a web server and a plurality of client computing devices. Each client computing device is operated by an end-user to access an application hosted by the web server based on end-user events resulting in calls to the web server. The proxy may be configured to pass through the calls to the web server and to return responses from the web server, with the return responses corresponding to activities being performed within the application. The analytics server may be configured to receive the end-user events from each client computing device, and to receive the calls and the return responses from the proxy. The analytics server may comprise a processor to correlate the end-user events with the corresponding calls and return responses from the proxy. Respective correlated end-user events, calls and return responses are translated into respective event vectors. The respective event vectors are processed to determine similarities among the client computing devices. The similar activities are associated with a quality indicator to identify anomalies within the application for corrective action to be taken.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be discussed below, a computing system with an analytics server is used for analyzing similar activities performed within an application across a large set of end-users. Vectorization techniques are used to compare similar activities being performed within the application across the large set of users. The similar activities are associated with a quality indicator to identify anomalies within the application for corrective action to be taken.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, solid-state storage devices, and/or any combination thereof.

Figure 1:
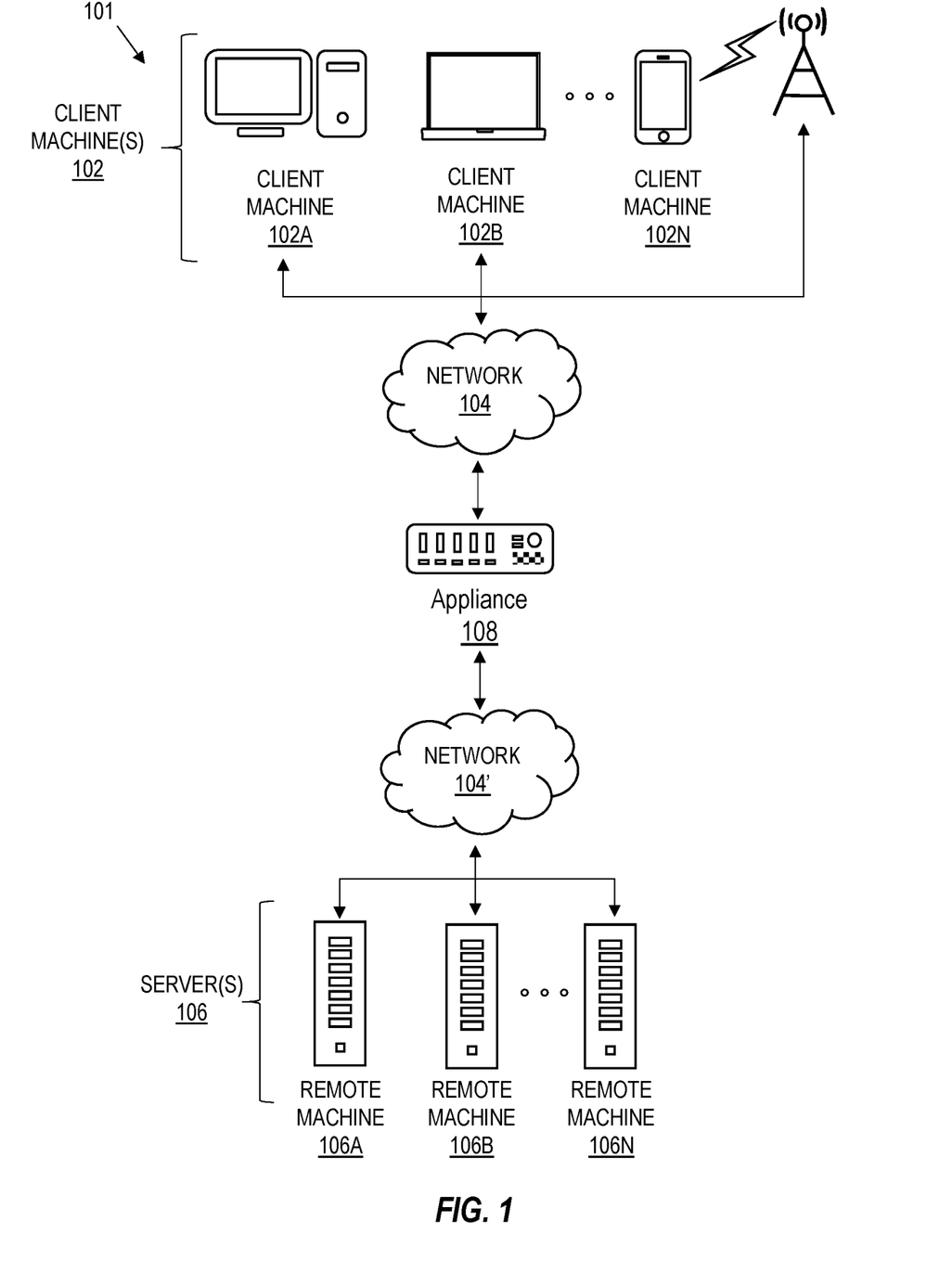
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer or Transport Layer Security Virtual Private Network (SSL/TLS VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
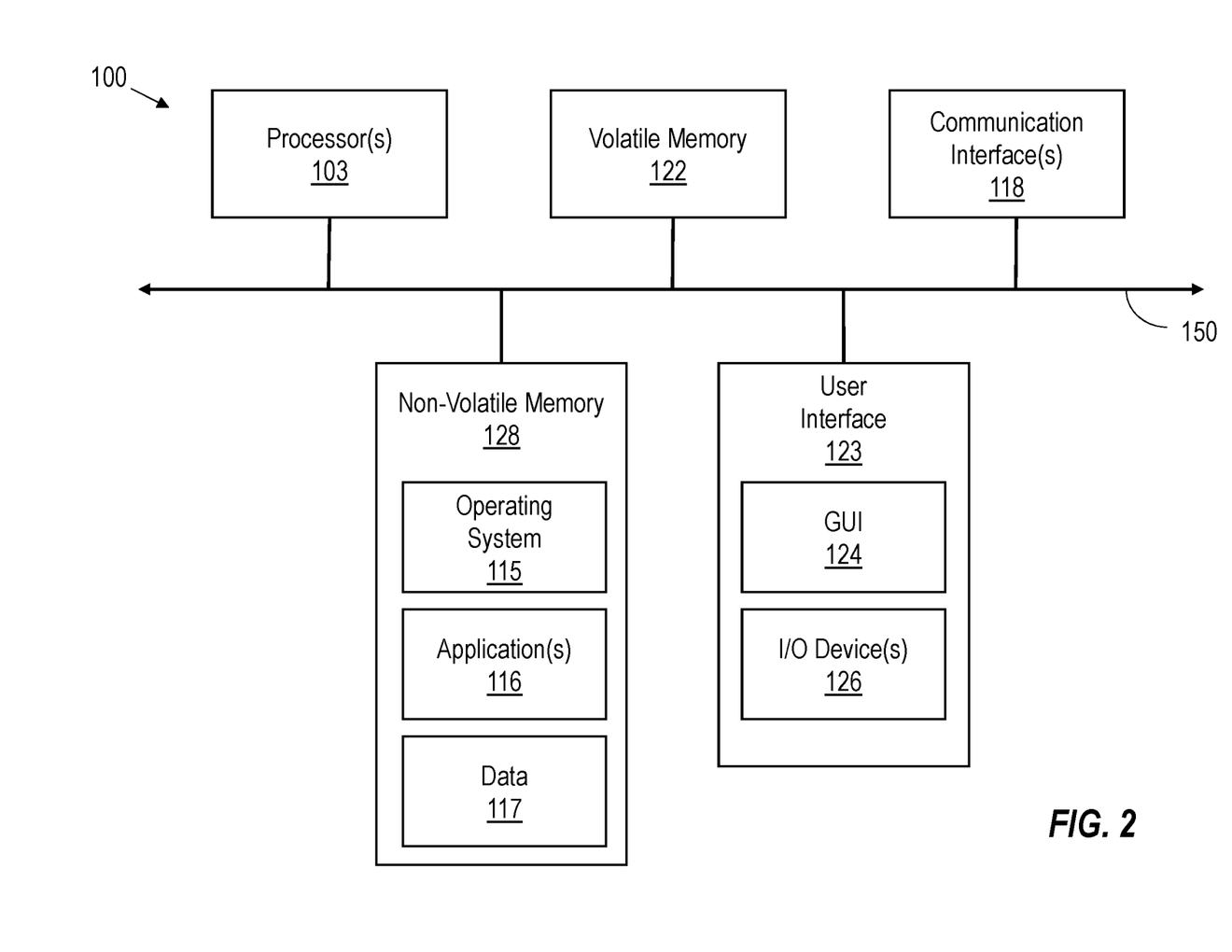
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
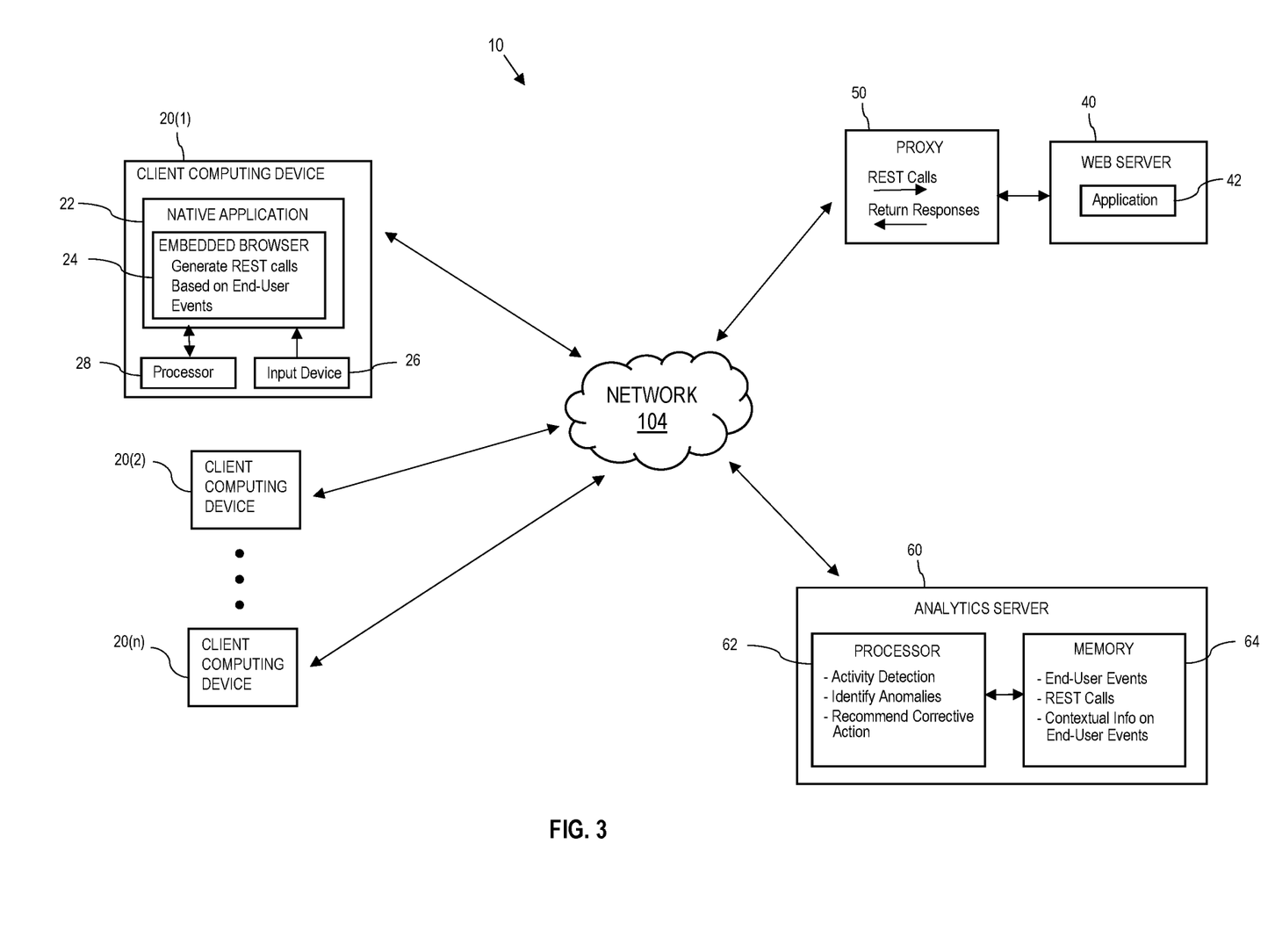
FIG. 3 is a block diagram of a computing system with an analytics server for analyzing similar activities performed within an application across a large set of end-users in which various aspects of the disclosure may be implemented.

Referring initially to FIG. 3, the illustrated computing system 10 includes client computing devices 20(1)-20(n), a web server 40 providing an application 42, a proxy 50 and an analytics server 60. The proxy 50 is positioned between the client computing devices 20(1)-20(n) and the web server 40. The analytics server 60 is in communications with the client computing devices 20(1)-20(n) and the proxy 50, and analyzes activities within the web application 42 as initiated by end-users of the client computing devices 20(1)-20(n).

As will be discussed in detail below, the analytics server 60 analyzes sequences of representational state transfer (REST) calls related to end-user tasks. Similar activities among the end-users are detected using vectorization techniques, with the similar activities being associated with quality indicators to identify anomalies across the end-users.

The quality indicator may be based on one or more statistics associated with the end-users accessing the application 42. Corrective action may be directed to quality improvement recommendations, for example, for end-users that are not as efficient in performing similar activities within the application 42 as compared to other end-users. As such, the systems and methods set forth herein advantageously provide improved performance within a virtualized and/or enterprise computing environment.

The client computing devices 20(1)-20(n) are generally referred to as client computing devices 20 and typically operate within an enterprise. Each of the end-users of the client computing devices 20(1)-20(n) access the same application 42 within the web server 40.

The number of computing devices 20 may vary from several hundred to several thousand, for example. The statistical data tends to be more accurate for larger sets of client computing devices 20. Statistical data may include calculation of standard deviations for the end-users operating the client computing devices 20 for performing particular activities within the application 42. Statistical data may also include calculation on the frequency and speed of performing particular activities within the application 42.

Each client computing device 20 includes an embedded browser 24 to access the application 42. The embedded browser 24 is a browser embedded within a native application 22. For example, Citrix Receiver and Citrix Workspace App are programs that are installed on client computing devices 20.

Since the embedded browser 24 is embedded within the native application 22 within the client computing device 20, this allows end-user events to be collected. End-user events include mouse clicks and key strokes, for example. One or more input devices 26 coupled to the native application 22 are used to generate the end-user events. A mouse and keyboard are example input devices 26.

More particularly, the end-user events are collected at the document object model (DOM) level within a web page. This advantageously allows attributes associated with the end-user events to be extracted from the DOM. Example attributes include the label of a button that has been clicked, page titles and the likes. Attributes may be used to provide contextual information corresponding to the activities being performed within the application 42. Each client computing device 20 provides end-user events and their corresponding attributes to the analytics server 60.

As readily appreciated by those skilled in the art, most applications are driven by representational state transfer (REST) services, where each end-user request results in one or more REST calls to the web server 40. Activities are performed within the application 42 in response to the received REST calls.

REST is a web design model used by many cloud service providers, enterprises, and social media companies to define interfaces with their services. A cloud service provider may offer scalable computing resources as services over networks, such as provisioning virtual machine instances which can run enterprise applications for customers. Many cloud storage service providers use REST to define data integration APIs that may be invoked to extract and load data, among other things.

Web services that conform to the REST architectural style, termed RESTful web services, provide interoperability between computer systems on the Internet. RESTful web services allow the requesting systems to access and manipulate textual representations of web resources by using a uniform and predefined set of stateless operations.

The web server 40 providing the application 42 is typically not owned by the enterprise. This is particularly so when the web server 40 is a Software as a Service (SaaS) server, and the web application 42 is a SaaS application. Consequently, the enterprise does not have access to the web server 40 for installing equipment to monitor activities within the application 42 across each of the client computing devices 20.

Instead, the illustrated computing system 10 includes a proxy 50 for listening to server requests and responses from the server 40. It appears that the client computing devices 20 are communicating directly with the web server 40, but the client computing devices 20 are actually communicating with the proxy 50.

The proxy 50 is forwarding the REST calls to the web server 40 and then collects the results to send back to the client computing devices 20. Since the proxy 50 is acting as a man-in-the-middle, the proxy 50 is able to forward the REST calls and the return responses to the analytics server 60.

As will now be discussed in greater detail, the analytics server 60 is configured to analyze sequences of REST calls related to end-user tasks for each client computing device 20. For discussion purposes, the illustrated application 42 is SalesForce. SalesForce is a customer relationship management (CRM) application provided by SalesForce.com, Inc.

An example activity within the application 42 is when an end-user goes from a log-in page to a particular customer in SalesForce. This activity is based on a series of end-users events. The end-user events may be different for different end-users. For example, end-users may use a different number of key strokes or mouse clicks to go from the log-in page to a particular customer. As an example, to get to a particular customer one approach involves using a single mouse click and another approach is to use a couple of keystrokes, such as command C to go to a customer.

Most applications, such as SalesForce, have customization levels and data submitted in each REST call that is likely to be different for each request. Detecting similar sequences related to an activity cannot be performed on simple compares of REST calls. It is also difficult to detect the beginning and end of an activity without control over the end-user environment (i.e., the web server 40).

The above limitations are overcome by the analytics server 60 communicating with the client computing devices 20 and with the proxy 50 via the network 104. The analytics server 60 includes a processor 62 and a memory 64. The memory 64 stores end-user events and associated contextual information as received from the client computing devices 20, and stores REST calls and return responses as received from the proxy 50.

The processor 62 correlates the end-user events with the corresponding REST calls and return responses from the proxy for each client computing device 20. The correlations also include the end-user's intent for each end-user event.

As noted above, the embedded browser 22 within each client computing device 20 monitors the end-user events by capturing events at the DOM level within a web page. The processor 28 within each client computing device 20 is configured to cooperate with the embedded browser 22 to extract end-user event attributes from the DOM, with the end-user event attributes providing contextual information on the corresponding end-user event, i.e., the end-user's intent. Example attributes include the label of a button that has been clicked, page titles and the likes.

The processor 62 within the analytics server 60 translates the respective correlated end-user events, contextual information associated with the end-user events, REST calls and return responses into respective event vectors for each client computing device 20. The REST calls and return responses may be referred to as REST services. An event vector may be represented as follows:

Event Vector=*f*(end-user event, contextual information, REST services)

The corresponding REST calls and return responses from the proxy 50 include parameter information noise, and the processor 62 is configured to remove the parameter information noise by applying one or more reducer functions. Parameter information noise refers to the parameter information contained within the REST services which can lead to a wide variety of vectors for end-users.

For instance, when end-users log-in and go to particular customers, the particular customers are different. One end-user goes to customer A and another end-user goes to customer C, for example. Since both end-users are going from the log-in page to a customer, it does not matter which customer. The common activity being performed within the SalseForce is the fact that end-users are going from the log-in page to a customer. Customer specifics is an example of parameter information noise.

One or more reducer functions are applied by the processor 62 to translate each event vector into one or more reduced event vectors. The reduced event vectors do not include the parameter information noise. A reduced event vector may be represented as follows:

Reduced Event Vector=$R$(Event Vector)

where R is the reducer function. Multiple reducer functions may be defined depending on the type of parameter information noise collected by the embedded browser 24.

A reducer function is based on skip-grams. Skip grams may also be referred to as k-skip-n-grams where it tries multiple variants (many) of skipping n events over a sequence of k events until it finds a better clustering of reduced vectors. Skip-grams reported for a certain skip distance k allow a total of k or less skips to construct the n-gram. As such, "4-skip-n-gram" results include 4 skips, 3 skips, 2 skips, 1 skip, and 0 skips.

All reduced end-user events are placed in sequence to collect end-user behavior for each client computing device 20. An activity may be defined by a common sequence of reduced event vectors across the end-users. Detecting activities is implemented by extracting n-sets of reduced event vectors from the sequence of events. An n-set of reduced event vectors is a subset of subsequent reduced event vectors in sequence, where n>1. An activity within the application corresponds to the selected n-set of event vectors in sequence.

Since it is difficult to detect the beginning and end of an activity, the value of n is selected using a sliding window. The value of n is to be selected so that the n-set of reduced event vectors in sequence corresponds to a pattern that includes a beginning and an end of the corresponding activity.

The processor 62 incrementally varies n for the n-set of event vectors, and generates an activity vector for each value of n. An activity vector may also be referred to as a composite activity vector since the reduced event vectors in the n-set of event vectors in sequence are added together for each client computing device 20. The processor 62 examines each composite activity vector for a pattern. In this example, the activity is going from a log-in page to a customer.

As an example, n may start at 2. The processor 62 generates a composite activity vector with 2 of the reduced event vectors that are in sequence and examines the composite activity vector for a common pattern. If a common pattern is not detected, then the value of n is incremented to 3 by the processor 62. The processor 62 now generates a composite activity vector by adding the next reduced event vector in sequence (i.e., n=3) and examines the composite activity vector for a common pattern. This process is repeated until a common pattern is detected, i.e., end-users going from a log-in page to a customer in SalesForce.

By having large volumes of these sequences the processor 62 is able to find common end sets and make a determination that this is apparently a pattern. There will be a series of reduced event vectors added together representing end-users going from a log-in page to a customer. At some point there is no more benefit to have n too large since commonality is lost.

The processor 62 keeps a history of the composite activity vectors for all of the subsets of the sliding window. Each of the composite activity vectors for each client computing device 20 are placed in vector space. Cosine calculations are performed by the processor 62 to detect similar activities across all users.

The similar activities are associated with a quality indicator to identify anomalies within the application 42 for corrective action to be taken. The quality indicator may be based on one or more statistics associated with the end-users accessing the application 42. The statistical data tends to be more accurate for larger sets of client computing devices 20.

Statistical data may include calculation of standard deviations for the end-users operating the client computing devices 20 for performing particular activities within the application 42. Statistical data may also include calculation on the frequency and speed of performing particular activities within the application 42.

An anomaly, for example, corresponds to an end-user taking too long to perform an activity as compared to the other end-users. In this case, corrective action includes recommending to the end-user which end-users events to use for more efficiently performing the activity. This recommendation may be automatically generated and provided to the end-user by the analytics server 60. Alternatively, the recommendation is provided by an administrator of the analytics server 60.

Another anomaly, for example, corresponds to an end-user performing an activity more frequently than the other end-users. For example, an end-user accesses a customer in SalseForce and then copies the retrieved customer information into a directory on their client computing device 20. If this end-user is doing this for an unusually large number of customers, as compared to the other end-users, then there could be a security concern. The administrator of the analytics server 60 will investigate to see if the end-user is stealing customer data.

Another anomaly, for example, may result in quality improvements to the application 42. For example, a large number of end-users access a customer and then delete a customer. These are separate activities performed by the end-users. It would be more efficient for these end-users to perform this access and deletion as part of the same activity. In this case, a request would be made to the administrator of the web server 40 to include this feature in their application 42.

Figure 4:
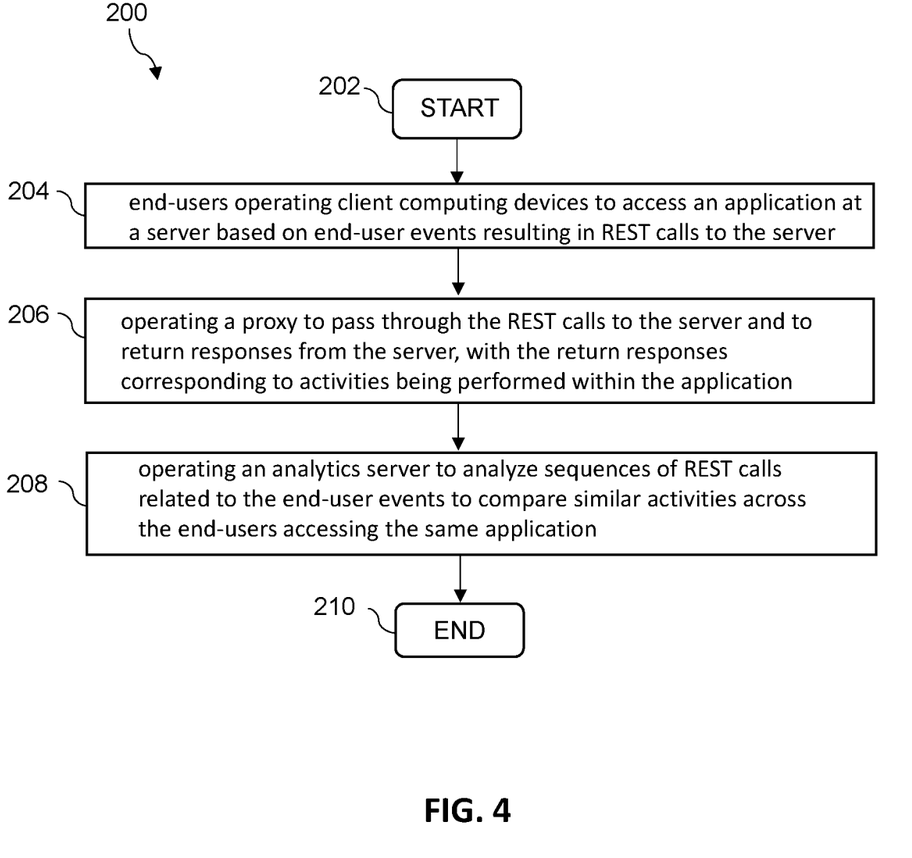
FIG. 4 is a general flowchart illustrating a method for operating the computing system illustrated in FIG. 3.

Referring now to the flowchart 200 in FIG. 4, and generally speaking, a method for operating the computing system 10 will be discussed. From the start (Block 202), the method includes operating client computing devices 20 to access an application 42 at a server 40 based on end-user events resulting in REST calls to the server 40 at Block 204. A proxy 50 is operated at Block 206 to pass through the REST calls to the server 40 and to return responses from the server 40, with the return responses corresponding to activities being performed within the application 42. An analytics server 60 is operated at Block 208 to analyze sequences of REST calls related to the end-user events to compare similar activities across a large set of end-users accessing the same application 42. The method ends at Block 210.

Figure 5:
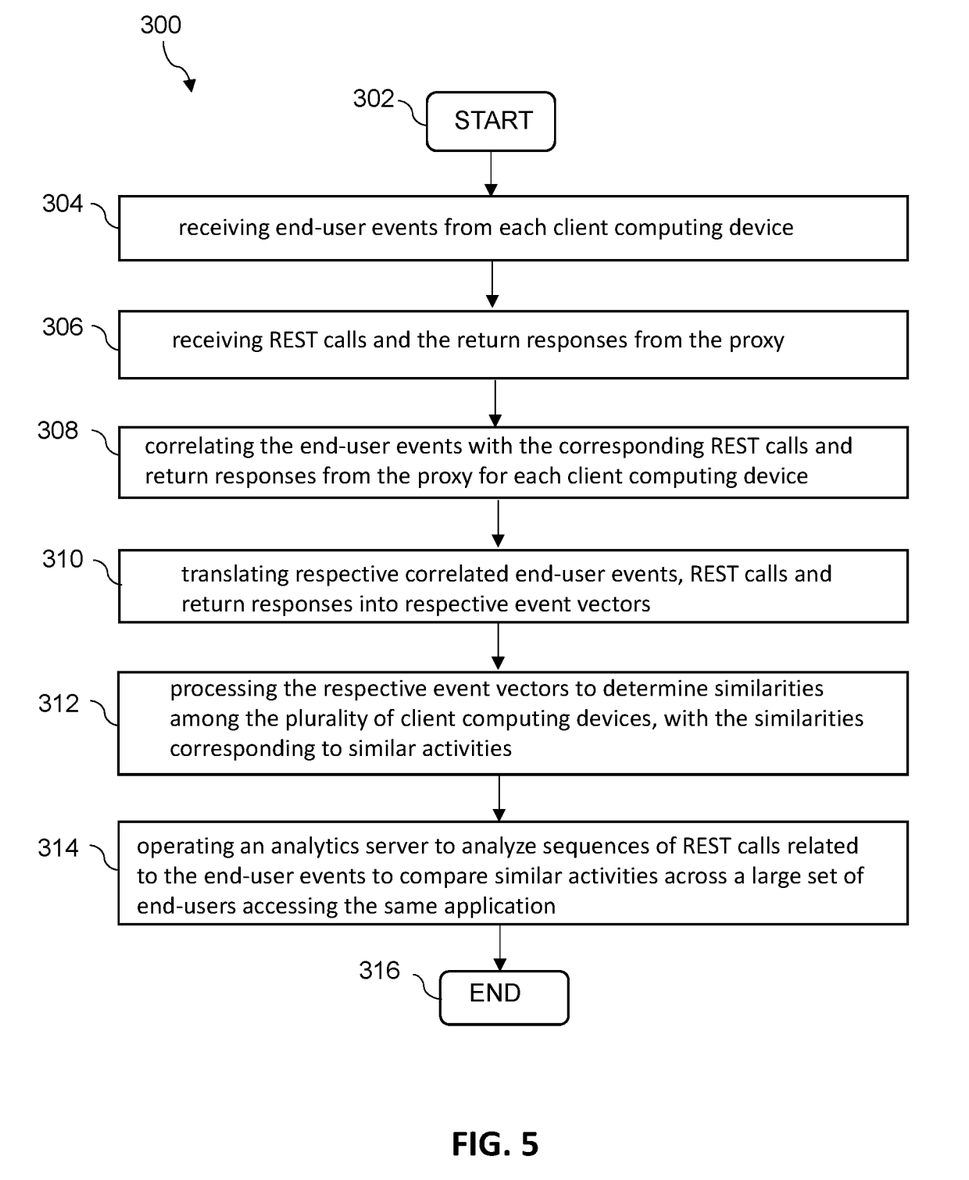
FIG. 5 is a general flowchart illustrating a method for operating the analytics server illustrated in FIG. 3.

Referring now to the flowchart 300 in FIG. 5, and generally speaking, a method for operating the analytics server 60 within the computing system 10 will be discussed. From the start (Block 302), the method includes receiving the end-user events from each client computing device 20 at Block 304, and receiving the REST calls and the return responses from the proxy 306 at Block 304. The end-user events are correlated with the corresponding REST calls and return responses from the proxy 50 for each client computing device 20 at Block 308. The method further includes translating respective correlated end-user events, REST calls and return responses into respective event vectors at Block 310. The respective event vectors are processed at Block 312 to determine similarities among the plurality of client computing devices, with the similarities corresponding to similar activities. The similar activities are associated with a quality indicator at Block 314 to identify anomalies within the application for corrective action to be taken. The method ends at Block 316.

Figure 6:
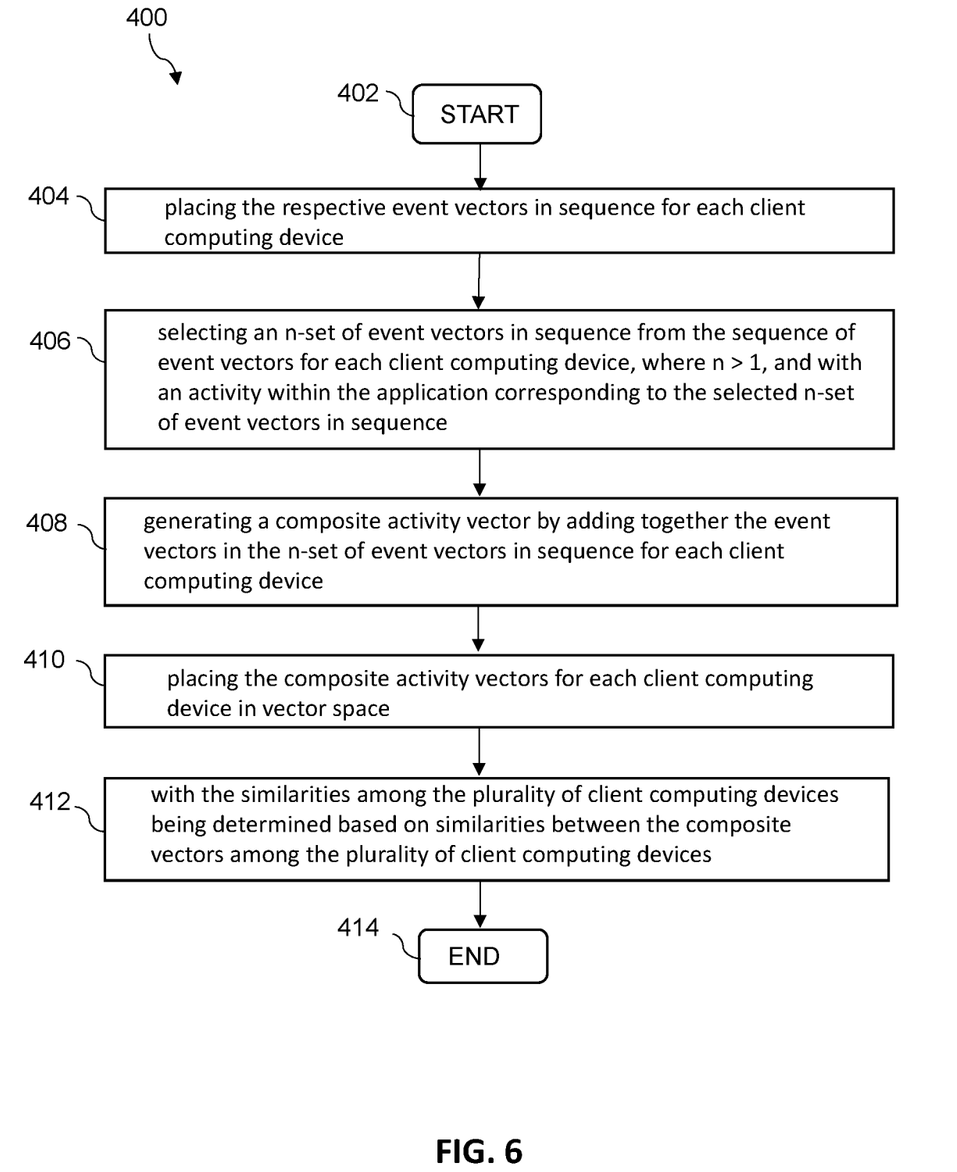
FIG. 6 is a more detailed flowchart for processing the respective event vectors in the flowchart of FIG. 5.

Referring now to the flowchart 400 in FIG. 6, a more detailed flowchart for processing the respective event vectors in the flowchart of FIG. 5 will be discussed. From the start (Block 402), the processing comprises placing the respective event vectors in sequence for each client computing device 20 at Block 404, and selecting an n-set of event vectors in sequence from the sequence of event vectors for each client computing device 20 at Block 406, where n>1. An activity within the application 42 corresponds to the selected n-set of event vectors in sequence. A composite activity vector is generated at Block 408 by adding together the event vectors in the n-set of event vectors in sequence for each client computing device 20. The composite activity vectors for each client computing device 20 are placed in vector space at Block 410. The similarities among the client computing devices 20 are determined at Block 412 based on similarities between the composite activity vectors among the plurality of client computing devices 20. The processing ends at Block 414.

Another aspect is directed to a non-transitory computer readable medium for operating an analytics server 60 within a computing system 10 comprising a web server 40 to provide an application 42; a plurality of client computing devices 20, with each client computing device 20 being operated by an end-user to access the application 42 based on end-user events resulting in representational state transfer (REST) calls to the web server 40; and a proxy 50 between the web server 40 and the plurality of client computing devices 20, and configured to pass through the REST calls to the web server 40 and to return responses from the web server 40, with the return responses corresponding to activities being performed within the application 42.

The non-transitory computer readable medium has a plurality of computer executable instructions for causing the analytics server 50 to receiving the end-user events from each client computing device 20, and receiving the REST calls and the return responses from the proxy 306. The end-user events are correlated with the corresponding REST calls and return responses from the proxy 50 for each client computing device 20. Respective correlated end-user events, REST calls and return responses are translated into respective event vectors. The respective event vectors are processed to determine similarities among the plurality of client computing devices 20, with the similarities corresponding to similar activities. The similar activities are associated with a quality indicator to identify anomalies within the application for corrective action to be taken.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. An analytics server comprising:
a memory and a processor coupled to said memory, and configured to perform the following:
receive from client computing devices end-user events, with each client computing device being operated by an end-user to access an application at a web server based on the end-user events resulting in calls being passed through a proxy to the web server,
receive from the proxy the calls being made to the web server, and receive return responses from the web server being passed through the proxy, with the return responses corresponding to activities being successfully performed within the application based on the end-user events,
correlate the end-user events with the corresponding calls and return responses from the proxy for each client computing device,
translate respective correlated end-user events, calls and return responses into respective event vectors,
process the respective event vectors to determine similarities among the client computing devices, with the similarities corresponding to similar activities, and
associate the similar activities with a quality indicator to identify anomalies within the application for corrective action to be taken.

2. The analytics server according to claim 1 wherein the calls being passed through the proxy to the web server comprise representational state transfer (REST) calls.

3. The analytics server according to claim 1 wherein said processor is further configured to process the respective event vectors by performing the following:
place the respective event vectors in sequence for each client computing device;
select an n-set of event vectors in sequence from the sequence of event vectors for each client computing device, where n>1, and with an activity within the application corresponding to the selected n-set of event vectors in sequence;
generate a composite activity vector by adding together the event vectors in the n-set of event vectors in sequence for each client computing device; and
place the composite activity vectors for each client computing device in vector space;
with the similarities among the client computing devices being determined based on similarities between the composite activity vectors among the client computing devices.

4. The analytics server according to claim 3 wherein determining the similarities comprising calculating a cosine distance between the composite activity vectors.

5. The analytics server according to claim 1 wherein said processor is further configured to perform the following:
receive contextual information associated with the end-user events; and
include the contextual information in the respective event vectors;
with the contextual information being provided based on each client computing device monitoring the end-user events by capturing events at the document object model (DOM) level within a web page, and extracting end-user event attributes from the DOM, with the end-user event attributes providing the contextual information on the corresponding end-user event.

6. The analytics server according to claim 1 wherein the corresponding calls and return responses from the proxy include parameter information noise, and wherein said processor is further configured to remove the parameter information noise by applying one or more reducer functions.

7. The analytics server according to claim 6 wherein applying the one or more reducer functions comprises translating each event vector into one or more reduced event vectors, with the resulting reduced event vectors being used as the event vectors by the processor.

8. The analytics server according to claim 1 wherein an n-set of event vectors in sequence corresponds to a pattern that includes a beginning and an end of the corresponding activity.

9. The analytics server according to claim 8 wherein said processor is further configured to perform the following:
   incrementally vary n for the n-set of event vectors;
   generate an activity vector for each value of n;
   examine each activity vector for a pattern; and
   select the n corresponding to the activity vector having a pattern.

10. The analytics server according to claim 1 wherein the quality indicator is based on one or more statistics associated with the end-users accessing the application.

11. The analytics server according to claim 1 wherein the corrective action comprises recommending to one or more end-users which end-users events to use for performing a particular activity within the application.

12. A method comprising:
   receiving from client computing devices end-user events, with each client computing device being operated by an end-user to access an application at a web server based on the end-user events resulting in calls being passed through a proxy to the web server;
   receiving from the proxy the calls being made to the web server, and receive return responses from the web server being passed through the proxy, with the return responses corresponding to activities being successfully performed within the application based on the end-user events,
   correlating the end-user events with the corresponding calls and return responses from the proxy for each client computing device;
   translating respective correlated end-user events, calls and return responses into respective event vectors;
   processing the respective event vectors to determine similarities among the client computing devices, with the similarities corresponding to similar activities; and
   associating the similar activities with a quality indicator to identify anomalies within the application for corrective action to be taken.

13. The method according to claim 12 wherein the calls being passed through the proxy to the web server comprise representational state transfer (REST) calls.

14. The method according to claim 12 wherein processing the respective event vectors comprises:
   placing the respective event vectors in sequence for each client computing device;
   selecting an n-set of event vectors in sequence from the sequence of event vectors for each client computing device, where n>1, and with an activity within the application corresponding to the selected n-set of event vectors in sequence;
   generating a composite activity vector by adding together the event vectors in the n-set of event vectors in sequence for each client computing device; and
   placing the composite activity vectors for each client computing device in vector space;
   with the similarities among the client computing devices being determined based on similarities between the composite activity vectors among the client computing devices.

15. The method according to claim 12 further comprising:
   receiving contextual information associated with the end-user events; and
   including the contextual information in the respective event vectors;
   with the contextual information being provided based on each client computing device monitoring the end-user events by capturing events at the document object model (DOM) level within a web page, and extracting end-user event attributes from the DOM, with the end-user event attributes providing the contextual information on the corresponding end-user event.

16. The method according to claim 12 wherein the corresponding calls and return responses from the proxy include parameter information noise, and where the processor is further configured to remove the parameter information noise by applying one or more reducer functions.

17. The method according to claim 16 wherein applying the one or more reducer functions comprises translating each event vector into one or more reduced event vectors, with the resulting reduced event vectors being used as the event vectors by the processor.

18. A computing system comprising:
   a proxy between a web server and a plurality of client computing devices, with each client computing device being operated by an end-user to access an application hosted by the web server based on end-user events resulting in calls to the web server;
   said proxy configured to pass through the calls to the web server and to return responses from the web server, with the return responses corresponding to activities being successfully performed within the application based on the end-user events; and
   an analytics server configured to receive the end-user events from each client computing device, and to receive the calls and the return responses from said proxy, with said analytics server comprising a processor configured to perform the following:
      correlate the end-user events with the corresponding calls and return responses from the proxy for each client computing device,
      translate respective correlated end-user events, calls and return responses into respective event vectors,
      process the respective event vectors to determine similarities among the plurality of client computing devices, with the similarities corresponding to similar activities, and
      associate the similar activities with a quality indicator to identify anomalies within the application for corrective action to be taken.

19. The computing system according to claim 18 wherein the calls being passed through the proxy to the web server comprise representational state transfer (REST) calls.

20. The computing system according to claim 18 wherein said analytics server is further configured to process the respective event vectors by performing the following:
   place the respective event vectors in sequence for each client computing device;
   select an n-set of event vectors in sequence from the sequence of event vectors for each client computing device, where n>1, and with an activity within the application corresponding to the selected n-set of event vectors in sequence;
   generate a composite activity vector by adding together the event vectors in the n-set of event vectors in sequence for each client computing device; and
   place the composite activity vectors for each client computing device in vector space;
   with the similarities among the plurality of client computing devices being determined based on similarities between the composite activity vectors among the plurality of client computing devices.

\* \* \* \* \*